United States Patent Office 3,822,313
Patented July 2, 1974

3,822,313
AMIDE PRODUCTION
John R. Norell, Bartlesville, Okla., assignor to Phillips Petroleum Company
No Drawing. Original application June 27, 1966, Ser. No. 560,859, now abandoned. Divided and this application May 22, 1969, Ser. No. 827,024
Int. Cl. C07c 103/08
U.S. Cl. 260—561 R                                    6 Claims

ABSTRACT OF THE DISCLOSURE

Production of amides by contacting a saturated hydrocarbon and/or unsaturated hydrocarbon with a nitrile and hydrogen fluoride with or without a reaction diluent such as sulfur dioxide, sulfolane and ammonium fluoride followed by hydrolysis to form the amides. The amides have utility as agricultural chemicals, for example, insecticides, herbicides, or fungicides.

RELATED INVENTION

This application is a divisional application of copending application having Ser. No. 560,859, filed June 27, 1966, now abandoned.

BACKGROUND OF THE INVENTION

This invention relates, broadly, to an improved process for the production of amides and imines. In one aspect, this invention relates to a process for the production of amides upon hydrolysis of imino fluoride products resulting from the reaction of an olefin with a cyanide in the presence of hydrogen fluoride. In accordance with another aspect, this invention relates to an improved process for the production of amides from olefins and cyanides and hydrogen fluoride in the presence of a diluent comprising sulfur dioxide. In accordance with a further aspect, this invention relates to novel amide products produced in accordance with said aforementioned processes. In another aspect, this invention relates to the production of imino fluorides from diolefins. In another aspect, it relates to the production of diamides from diolefins in accordance with a modified reaction. In a further aspect, it relates to the reaction of saturated hydrocarbons with cyanides and hydrogen fluoride in the presence of a carbonium ion donor to produce amides. In yet another aspect, it relates to the addition of water to the reaction between olefins, cyanides and hydrogen fluoride to increase the reaction yield. In still another aspect, it relates to the production of an imine by the reaction of a tetraalkylethylene with hydrogen cyanide and hydrogen fluoride.

In the preparation of amides by employing the Ritter reaction, in which a suitable nitrile and a suitable olefin are reacted in the presence of a material such as strong sulfuric acid, it is frequently difficult to control the reaction temperature and extensive efforts are usually required in order to insure the control of the dangerous exotherm resulting from such a reaction. Also, in the known procedures for the preparation of amides the processes have sometimes resulted in poor yields of the desired product.

According to the invention, it has been found that the yields of amides can be substantially increased by carrying out the reaction of saturated and ethylenically unsaturated hydrocarbons and cyanides in the presence of hydrogen fluoride. Further according to the invention, it has been found that by carrying out the reaction of saturated and ethylenically unsaturated hydrocarbons with a cyanide in the presence of sulfur dioxide, isomerization and polymerization side reactions are minimized.

Accordingly, an object of this invention is to provide an improved process for the production of amides.

Another object of this invention is to increase the yields of amides formed from olefins and cyanides.

A further object of this invention is to provide novel amide products.

A still further object of this invention is to provide a process for the reaction of olefins with cyanides wherein isomerization and polymerization of reactants forming undesirable materials is minimized.

A further object of this invention is to form diamides by the reaction of diolefins and cyanides.

A further object of this invention is to provide an imine by the reaction of a tetraalkylethylene with hydrogen cyanide.

A further object of this invention is to react saturated hydrocarbons with cyanides to form amides.

A further object is to produce imino fluorides by the reaction of olefins and cyanides in the presence of hydrogen fluoride.

A further object is to produce an imine from a tetraalkylethylene.

Other aspects and objects, as well as the several advantages of this invention, will be apparent to those skilled in the art from a study of this specification and the appended claims.

In accordance with the present invention, saturated and ethylenically unsaturated hydrocarbons are reacted with cyanides in the presence of hydrogen fluoride, with or without a solvent. In one aspect, the reactants are so chosen as to yield imino fluorides which are capable of forming amides upon hydrolysis. In another aspect, the reactants are so chosen as to yield imines.

The hydrocarbons which are suitable in the process of my invention can be saturated hydrocarbons, or can have one or more points of ethylenic unsaturation in the molecule. These hydrocarbons can have up to and including about 30 carbon atoms. The saturated hydrocarbons which are suitable for use in the process of my invention have at least one tertiary carbon atom present.

Cyclic hydrocarbons having olefinic unsaturation are also suitable. When compounds having multiple points of ethylenic unsaturation are used, polyamides are formed.

Further, in accordance with the invention, I form imines by the reaction of tetraalkylethylenes with hydrogen cyanide in the presence of hydrogen fluoride.

The use of hydrogen fluoride in the process of this invention offers distinct advantages over the use of other acidic substances such as sulfuric acid which have been employed previously in the production of amides from olefins and cyanides. For example, when linear olefins or other olefins which cannot form tertiary carbonium ions are treated with cyanides in a medium comprising sulfuric acid and acetic acid, as in the original Ritter method (U.S. Pat. No. 2,573,673), little or no amide is produced. On the other hand, when such olefins are employed in the process of this invention wherein hydrogen fluoride is employed, good yields of amides are readily obtained. Furthermore, the low volatility of sulfuric acid precludes its separation from the reaction mixture prior to hydrolysis. Thus, not only is the excess sulfuric acid lost, but also a large amount of base is required to neutralize it. On the other hand, the volatility of hydrogen fluoride permits its recovery prior to hydrolysis, thus permitting it to be recycled for further use in the process and reducing the amount of base required for neutralization of the hydrolyzed reaction mixture.

The use of hydrogen fluoride and sulfur dioxide or other equivalent solvents such as sulfolane in the process of this invention offers distinct advantages over the use of other acidic substances such as sulfuric acid which have been employed previously. For example, when linear olefins or other olefins which cannot form tertiary carbonium ions are treated with cyanides in a medium comprising sulfuric acid and acetic acid as in the original Ritter method (U.S. Pat. No. 2,573,673), little or no amide is produced. On the other hand, when such olefins are employed in the process of this invention wherein hydrogen fluoride and sulfur dioxide are employed, good yields of amides are readily obtained. Furthermore, the low volatility of sulfuric acid precludes its separation from the reaction mixture prior to hydrolysis. Thus, not only is the excess sulfuric acid lost, but also a large amount of base is required to neutralize it. On the other hand, the volatility of hydrogen fluoride and sulfur dioxide permits their recovery prior to hydrolysis, thus permitting them to be recycled for further use in the process and reducing the amount of base required for neutralization of the hydrolyzed reaction mixture.

In accordance with the invention, the hydrocarbons that can be reacted according to the process of my invention are saturated or unsaturated at one or more points of ethylenic unsaturation, and have up to and including about 30 carbon atoms per molecule. When unsaturated hydrocarbons are used, it is necessary that the molecule contain one or more tertiary carbon atoms. The saturated hydrocarbons can be acylic or cyclic. The unsaturated hydrocarbons can be straight chain, branched chain, or cyclic compounds having at least one point of ethylenic unsaturation.

Examples of some of the saturated hydrocarbons which can be used in the process of my invention are 2-methylpropane, 2-methylbutane, 3-methylpentane, 2,3-dimethylbutane, 3-methylheptane, 4-ethyldecane, 2,4-dimethyldodecane, 3-ethyldodecane, 6-butylhexacosane, methylcyclopentane, methylcyclohexane, 1,3 - dimethylcyclohexane, ethylcyclooctane, butylcyclodecane, decahydronaphthalene, adamantane, perhydroacenaphthene, and the like.

Examples of some olefins which can be employed in the process of this invention include ethylene, propane (propylene), 1-butene, 2-butene, 2-pentene, 3-hexene, 1-octene, 2-octene, 2-decene, 1-dodecene, 4-tetradecene, 1-hexadecene, 1-octadecene, 10-eicosene, 4-triacontene, 2-methylpropene (isobutylene), 2-methyl-2-butene, 2,3-dimethyl-2-butene, 3-ethyl-1-pentene, 4-isopropyl-2-octene, 6-tert-butyl-3-decene, 2-cyclohexylpropene, 1-cyclopentyl-2-butene, 2-(2-methylcyclopentyl)-3-hexene, styrene, 1-phenyl-2-pentene, 2-p-tolyl-3-octene, cyclobutene, cyclopentene, cyclohexene, 3-methylcyclooctene, cyclododecene, cyclooctadecene, and the like.

Examples of compounds having more than one point of olefinic unsaturation which are suitable for use in the process of my invention are 1,3-butadiene, isoprene, piperylene, 2,5 - dimethyl-1,5-hexadiene, 1,6-dodecadiene, 1,5-eicosadiene, 1,10-triacontadiene, 4-vinylcyclohexene, 3-allylcyclohexene, 1-phenyl-1,4-pentadiene, 3-o-tolyl-1,6-octadiene, 1-phenyl-7-cyclopentyl - 2,5 - heptadiene, 1,5-cyclooctadiene, and the like.

Cyanide compounds that can be reacted according to the invention have the formula

R"CN wherein R" is selected from the group consisting of hydrogen and alkyl, cyclo alkyl, and aryl radicals, and combinations thereof such as alkaryl radicals, aralkyl radicals, and the like, the number of carbon atoms in said radicals preferably not exceeding about 24 carbon atoms. When hydrogen cyanide is to be employed, it is possible to use an alkali metal cyanide which will react in situ with the hydrogen fluoride to produce hydrogen cyanide.

Examples of some cyanides which can be employed in the process of this invention include hydrogen cyanide, acetonitrile, propionitrile, butyronitrile, hexanenitrile, decanenitrile, hexadecanenitrile, pentacosanenitrile, isobutyronitrile, 2,2-dimethylhexanenitrile, 4-ethyldodecanenitrile, cyclohexanecarbonitrile, 3 - methylcyclopentane carbonitrile, cyclopentaneacetonitrile, benzonitrile, phenylacetonitrile, p-tolunitrile, and the like.

When the hydrocarbons are reacted with cyanides in the presence of HF according to my invention, an imino fluoride group is formed at each point of olefinic unsaturation in the molecule, and at each tertiary carbon atom. These imino fluoride groups can be hydrolyzed to amides; thus, a diamide can be produced by use of a diolefin as the starting material. Monoamides will be formed when monoolefins are used.

Amides which can be produced by the process of this invention include those having the formula

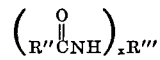

wherein $x$ is 1 or 2, R" is as defined hereinabove, and R'" is a monovalent or divalent hydrocarbon radical selected from the group consisting of alkyl, cycloalkyl, bicycloalkyl, tricycloalkyl, alkylene, and cycloalkylenealkylene, and aryl-substituted derivatives and combinations thereof, e.g., aralkyl, alkylcycloalkyl, alkaralkyl, cycloalkylalkyl, aralkylene, and the like, the number of carbon atoms in R'" being within the range of 2 to about 30.

Examples of some amides which can be produced by the process of this invention include: formamidoethane, acetamidoethane, 2-propionamidobutane, 3-butyramidohexane, 4-hexanamido-4-isopropyloctane, α-decanamidostyrene, 1-hexadecanamido-4-methylcyclooctane, 6-pentacosanamidotriacontane, 2 - (2 - methylpropionamido)-2-methylpropane, (2,2 - dimethylhexanamido)cyclobutane, 3 - (4 - ethyldodecanamido)hexadecane, 1-phenyl-3-cyclo hexanecarboxamidopentane, (3 - methylcyclopentanecarboxamido)cyclopentane, 2 - (2 - cyclopentylacetamido) propane, 4-benzamidooctane, (2-phenylacetamido)cyclohexane, 2-(2-methylcyclopentyl)-4-p-toluamidohexane, 3-formamidododecane, 10-acetamidoeicosane, 2-formamido-2,3-dimethylbutane, 2-benzamido-3-ethylpentane, 3-acetamido-6-tert-butyldecane, 2-formamido - 2 - cyclohexylpropane, 1-cyclopentyl-3-propionamidobutane, 2-p-tolyl-4-formamidooctane, formamidocyclododecane benzamidocyclooctadecane, and the like.

Examples of some diamides which can be produced by the process of this invention include: 2,3-diformamidobutane, 2-methyl-2,3-diacetamidobutane, 2,5-diacetamido-2,5-dimethylhexane, 2,4-dibutyramidopentane, 2,6-bis(2-methyldecanamido)dodecane, 2,5 - dibenzamidoeicosane, 2,10 - dipentacosanamidotriacontane, 1-(1-acetamidoethyl)-4-acetamidocyclohexane, 1-phenyl-2,5-dicyclohexanecarboxamidooctane, 3,7 - bis(2 - phenylacetamido)hexadecene, 2,6-di-m-toluamidodecane, 2,5-bis(2-cyclopentylacetamido)-3-ethylheptane, and the like.

In accordance with the present invention, the following novel compounds are produced: formamidohexadecane, formamidooctane, formamidooctadecane, butyramidooctane, acetamidododecane, benzamidooctane, acetamidocyclododecane, 2,5 - diacetamido-2,5-dimethylhexane, 2-acetamidobicyclooctane-3.3.0 and 2,3,3,6,6,7-hexamethyl-5-aza-1,4-octadiene.

In the process of this invention, the cyanide can be either hydrogen cyanide or an organic cyanide, or nitrile, as described above. Although the cyanide:olefin mole ratio can vary over a broad range, it will generally be within the range of about 0.2:1 to 20:1, preferably being within the range of about 0.5:1 to 5:1. The hydrogen fluoride: olefin mole ratio also can vary over a wide range, but will generally be within the range of about 2:1 to 60:1, preferably being within the range of about 5:1 to 40:1. Although the hydrogen fluoride can be used in a substantially anhydrous form, it can also be employed as an aqueous solution containing up to 40 weight percent, or more, water, in which instance at least a portion of the imino fluoride product is hydrolyzed to the amide, or amides, prior to any subsequent hydrolysis step. If desired, a diluent, e.g., water, an acid such as acetic acid or propionic acid, or an ether such as diethyl ether or dibutyl ether, can be employed in the process.

Although the reaction utilizing hydrogen fluoride can be carried out over a rather broad temperature range, the temperature will generally be within the range of about −70° to 150° C., preferably being within the range of about 0 to 70° C. When diolefins are being reacted, lower temperatures, such as −50 to 0° C. will generally be found preferable to prevent polymerization of the diolefin. The reaction time can vary considerably, depending in part on the reaction temperature and the nature of the reactants, but will generally be within the range of about one minute to 48 hours, usually being within the range of about ten minutes to 5 hours. The reaction pressure need be only sufficient to keep the reactants substantially in the liquid phase.

When the reaction is carried out in a solvent, such as sulfur dioxide or sulfolane, the ratio of solvent to hydrocarbon can vary over a wide range. Up to about 5000 milliliters of solvent per mol of hydrocarbon will be satisfactory, but generally 1000 milliliters or less per mol olefin will be employed.

In carrying out the reaction, the cyanide is preferaby added to the hydrogen fluoride, in the presence or absence of a diluent, followed by the addition of the hydrocarbon as such or dissolved in a diluent. However, any order of addition can be used. The resulting mixture is then agitated in any convenient manner. Upon substantial completion of the reaction, the reaction mixture can be treated with water, with or without prior recovery of free hydrogen fluoride by distillation or other suitable means. The hydrolyzed mixture can be neutralized by conventional procedures employing sodium hydroxide, sodium carbonate, ammonia, and the like, and the amides can then be separated by conventional methods such as extraction with ether, chloroform, methylene chloride, hexane, and the like. The amides are then isolated and purified by well known procedures such as distillation, crystallization, and the like.

In carrying out the reaction in the presence of $SO_2$, the sulfur dioxide, hydrogen fluoride, cyanide, and olefin can be added in any order. In a preferred procedure, the cyanide is added to a mixture of the sulfur dioxide and hydrogen fluoride, in the presence or absence of a diluent, followed by the addition of the olefin as such or dissolved in a diluent. The resulting mixture is then agitated in any convenient manner. Upon substantial completion of the reaction, the reaction mixture can be treated with water, with or without prior recovery of sulfur dioxide and hydrogen fluoride by distillation or other suitable means. The hydrolyzed mixture can be neutralized by conventional procedures employing sodium hydroxide, sodium carbonate, ammonia, and the like, and the amides can then be separated by conventional methods such as extraction with ether, chloroform, methylene chloride, hexane, and the like. The amides are then isolated and purified by well known procedures such as distillation, crystallization, and the like.

I have further found that both the yield and purity of the product produced by the reaction of olefins or diolefins with cyanides in the presence of hydrogen fluoride can be improved by the addition of water and/or ammonium fluoride to the reaction mixture. This improvement in the reaction product is noted with those olefins which are capable of forming tertiary carbonium ions, and with cyclic olefins generally, even though these are not capable of forming tertiary carbonium ions.

The process of the instant invention wherein water and/or ammonium fluoride are employed is particularly useful when the olefin employed tends to undergo substantial polymerization during the course of the desired reaction. Thus, the process is especially useful when polyolefins are employed, when cyclic olefins are employed, or when acyclic olefins are employed in which branching occurs on at least one of the carbon atoms attached to the olefinic double bond, i.e., when at least one of the carbon atoms attached to the olefinic double bond is singly bonded to each of two carbon atoms. The cyanide can be either hydrogen cyanide or an organic cyanide, i.e., nitrile.

When ammonium fluoride is used, the mole ratio of ammonium fluoride to olefin can vary over a wide range, this ratio generally being within the range of about 0.1:1 to 10.1, usually being within the range of about 0.5:1 to 2:1. The cyanide:olefin mole ratio can vary over a broad range, too, but will generally be within the range of about 0.2:1 to 20:1, preferably being within the range of about 0.5:1 to 5:1. The hydrogen fluoride:olefin mole ratio also can vary over a wide range, but will generally be within the range of about 2:1 to 60:1, preferably being within the range of about 5:1 to 40:1. The hydrogen fluoride can be used in substantially anhydrous form, or it can be employed as an aqueous solution containing up to 40 weight percent, or more, water, in which instance at least a portion of the imino fluoride products are hydrolyzed to the corresponding amides prior to any hydrolysis step. If desired, a diluent, e.g., sulfur dioxide, an acid such as acetic acid or propionic acid, or an ether such as diethyl ether or dibutyl ether, can be employed in the process.

When water is used, as little as 1 weight percent of water in the hydrogen fluoride will give somewhat improved results. Generally, a minimum of 5 weight percent of water will be employed. Although it ordinarily will not be desirable to have more than 40 weight percent water in the hydrogen fluoride, under particular reaction conditions, up to about 60 weight percent or even a little more water can be used. It is within the scope of this invention to employ both water and ammonium fluoride in admixture.

Although the reaction utilizing water and/or ammonium fluoride can be carried out over a rather broad temperature range, the temperature will generally be within the range of about −70 to 150° C., preferably being within the range of about 0 to 70° C. The reaction time can vary considerably, depending in part on the reaction temperature and the nature of the reactants, but will generally be within the range of about 1 minute to 48 hours, usually being within the range of about 10 minutes to 5 hours. The reaction pressure need be only sufficient to keep the reactants substantially in the liquid phase.

In carrying out the reaction in the presence of water and/or ammonium fluoride, the order of addition of the starting materials can vary although it is usually preferable that the olefin be added to a mixture of the other starting materials. Upon substantial completion of the reaction, the reaction mixture can be treated with water, with or without prior recovery of free hydrogen fluoride and solvent, if present, by distillation or other suitable means. The hydrolyzed mixture can be neutralized by conventional procedures employing sodium hydroxide, sodium carbonate, ammonia, and the like, and the amides can then be separated by conventional methods such as extraction with ether, chloroform, methylene chloride, hexane, and the like. The amides are then isolated and purified by well known procedures such as distillation, crystallization, and the like.

When it is desired to react a saturated hydrocarbon having a tertiary carbon atom in accordance with the process of my invention, it is necessary to add to the reaction mixture a compound which is a precursor of carbonium ions. When the reaction is carried out in the manner described below, an imino fluoride is obtained which is subsequently hydrolyzed to an amide in which the nitrogen atom of the amino group is attached to the tertiary carbon atom.

The reaction is carried out by contacting the hydrocarbon having a tertiary carbon atom with one of the cyanides disclosed above and with hydrogen fluoride in the presence of a precursor of carbonium ions.

Together with the desired amido derivative of said saturated hydrocarbon there is produced some amido derivative of said precursor of carbonium ions. The process is particularly useful in that amides can be produced from said saturated hydrocarbons without first introducing a reactive site such as an olefinic linkage, halogen atom, or hydroxyl group into the saturated hydrocarbon molecule. The use of hydrogen fluoride instead of sulfuric acid in this process is especially advantageous in that the volatility of the hydrogen fluoride permits its recovery prior to hydrolysis, thus enabling it to be recycled for further use in the process and reducing the amount of base required for neutralization of the hydrolyzed reaction mixture.

The precursor of carbonium ions can be any substance capable of forming carbonium ions in the reaction medium employed. Thus, the precursor of carbonium ions can be selected from the group consisting of olefins, alcohols, alkyl halides, and the like. The olefins used will preferably have about 3 to 10 carbon atoms, including such olefins as propene, 1-butene, 2-butene, 2-methylpropene, 1-pentene, 1-hexene, 2-octene, 3-ethyl-2-octene, and the like. Although other alcohols can be used, alcohols which are particularly suitable are those containing up to about 5 carbon atoms, the preferred alcohols being secondary or tertiary alcohols such as 2-butanol or *tert*-butyl alcohol. Alkyl halides which are especially suitable are those containing up to about 5 carbon atoms, the preferred halides being secondary or tertiary alkyl fluorides and secondary or tertiary alkyl chlorides such as 2-fluorobutane and *tert*-butyl chloride. Other alkyl halides, of course, can be used.

In the process of this invention, the mole ratio of said saturated hydrocarbon to said precursor of carbonium ions can vary over a wide range, but will generally be within the range of about 0.5:1 to 20:1, usually being within the range of about 2:1 to 6:1. The mole ratio of cyanide to precursor of carbonium ions also can vary considerably, but will generally be within the range of about 0.2:1 to 20:1, preferably being within the range of about 0.5:1 to 5:1. The mole ratio of hydrogen fluoride to precursor of carbonium ions can vary over a broad range, but will generally be within the range of about 2:1 to 60:1, preferably being within the range of about 5:1 to 40:1. The hydrogen fluoride can be used in substantially anhydrous form, or it can be employed as an aqueous solution containing up to 40 weight percent, or more, water, in which instance at least a portion of the imino fluoride product is hydrolyzed to the corresponding amide prior to any subsequent hydrolysis step. If desired, a diluent, e.g., water, sulfur dioxide, an acid such as acetic acid or propionic acid, or an ether such as diethyl ether or dibutyl ether, can be employed in the process.

Although the reaction utilizing hydrogen fluoride and a saturated hydrocarbon can be carried out over a rather broad temperature range, the temperature will generally be within the range of about —40 to 75° C. The reaction time can vary considerably, depending in part on the reaction temperature and the nature of the reactants, but will generally be within the range of about 1 minute to 48 hours, usually being within the range of about 10 minutes to 8 hours. The reaction pressure need be only sufficient to keep the components of the mixture substantially in the liquid phase.

Although any order of addition can be employed, it is preferable that the cyanide and carbonium ion precursor be added as a mixture to the mixture containing hydrogen fluoride and saturated hydrocarbon, thereby aiding in maintaining an excess of the saturated hydrocarbon in the reacting mixture. The mixture can be agitated in any convenient manner. Upon substantial completion of the reaction, the reaction mixture can be treated with water, with or without prior recovery of free hydrogen fluoride and/or unreacted components by distillation or other suitable means. The hydrolyzed mixture can be neutralized by conventional procedures employing sodium hydroxide, sodium carbonate, ammonia, and the like, and the amides can then be separated by conventional methods such as extraction with ether, chloroform, methylene chloride, hexane, and the like. The amides can then be isolated and purified by well known procedures such as distillation, crystallization, and the like.

I have further discovered that novel imines can be produced by the process of my invention. When I react a tetraalkylethylene having the formula $R_2C=CRCHR'_2$ with hydrogen cyanide in a hydrogen fluoride medium, I can produce an imine having the formula

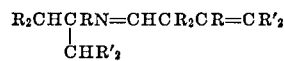

In these structural formulae, each R is selected from alkyl groups having not more than 8 carbon atoms, and each R' is selected from hydrogen and alkyl groups having not more than 8 carbon atoms. The total number of carbon atoms in the tetraalkylethylene preferably does not exceed 24.

In the preparation of imines by the process of this invention, the hydrogen cyanide:tetraalkylethylene mole ratio can vary over a broad range, but will generally be within the range of about 0.2:1 to 20:1, preferably being within the range of about 0.5:1 to 5:1. If desired, the hydrogen cyanide can be formed in the reaction vessel by reaction of hydrogen fluoride with a cyanide salt, e.g., an alkali metal cyanide such as sodium cyanide, potassium cyanide, or the like. The hydrogen fluoride:tetraalkylethylene mole ratio also can vary over a wide range, but will generally be within the range of about 1:1 to 60:1, preferably being within the range of about 3:1 to 40:1. Although the hydrogen fluoride should be in substantially anhydrous form, diluents such as sulfur dioxide and ethers can be present.

Although the reaction for preparing the imine can be carried out over a rather broad temperature range, the temperature will generally be within the range of about —70 to 150° C., preferably being within the range of about —20 to 70° C. The reaction time can vary considerably, depending in part on the reaction temperature, but will generally be within the range of about 1 minute to 48 hours, usually being within the range of about 10 minutes to 8 hours. The reaction pressure need be only sufficient to maintain the components of the mixture substantially in the liquid phase.

Upon termination of the reaction, the imine product water, with or without prior recovery of hydrogen fluoride can be isolated by well known separation techniques. In a preferred procedure, the reaction mixture is treated with water, with or without prior recovery of hydrogen fluoride by distillation or other suitable means, and the aqueous mixture is neutralized by conventional procedures employing sodium hydroxide, sodium carbonate, ammonia, and the like. The imine is then separated by conventional methods such as extraction with ether, chloroform, methylene chloride, hexane, and the like. The imine is then isolated and purified by well known procedures such as distillation, crystallization, and the like.

The imines of this invention are useful as monomers in polymerization processes. The imines are also readily hydrogenated to secondary amines of value. Furthermore, the imines can be hydrolyzed to obtain unsaturated aldehydes, useful as monomers, and saturated amines.

When 1,5-cyclooctadiene is reacted with a cyanide in the presence of HF, in accordance with the process of my invention, the reaction which occurs is a transannular amidation. This reaction will produce 2-acetamidobicyclooctane-3.3.0. Reaction conditions are the same as those set forth above for the reactions of the diolefins with cyanides.

All of the amides which can be produced by the process of my invention can be hydrolyzed by conventional procedures to form amines.

The amides produced by the process of this invention are useful as additives for lubricating and cutting oils; as compounding agents in greases and waxes; as corrosion inhibitors; as fiber modifiers, lubricants, and spinning aids; as anti-caking agents; as slip, anti-block, and anti-static agents; as solvents for polymers and agricultural chemicals; as reaction solvents; as selective extractants; as paint strippers; as adhesion promoters; and as intermediates in the pharmaceutical industry. The imino fluoride compounds produced by the process of this invention are useful intermediates in the production of amides. The amides also have utility as agricultural chemicals, e.g., insecticides, herbicides, or fungicides.

EXAMPLE I

Acetamidooctanes.—Anhydrous hydrogen fluoride (50 ml., 2.5 moles) was placed in a polyethylene reactor containing a Teflon-coated stirring bar and then cooled to −20° C. Acetonitrile (4.5 g., 0.11 mole) was added dropwise, followed by dropwise addition of 1-octene (11.2 g., 0.10 mole). The mixture was allowed to spontaneously warm to room temperature and stirred for 5 hours. The excess hydrogen fluoride was removed by passing nitrogen through the system. The residue was then poured on ice and made strongly basic with solid sodium carbonate and ammonium hydroxide. The mixture was extracted with three 100 ml. portions of ethyl ether, and the ether extracts were dried overnight with a mixture of magnesium sulfate and potassium carbonate. Removal of the ether gave as a residue 12.9 g. (72 mole percent crude yield) of a mixture of 2-acetamidooctane, 3-acetamidooctane, and 4-acetamidooctane, these isomers being present in a ratio of 40:44:16, respectively. This ratio of isomers was determined by gas chromatographic analysis on a 9-foot Apiezon L on Chromosorb W column programmed from 125 to 275° C. The elution temperatures of the 2-, 3-, and 4-acetamidooctanes were 270° C., 266° C., and 263° C., respectively. The identity of the individual isomers was determined by individually synthesizing the isomeric acetamido compounds from the corresponding octylamines and comparing the retention times gas chromatographically.

EXAMPLE II

Acetamidooctanes by Ritter's Original Method.—A comparative experiment was carried out in which Ritter's original method (U.S. 2,573,673) for the amidation of olefins was used. Into a 125 ml. flask were placed 10 g. of concentrated sulfuric acid and 50 ml. of glacial acetic acid followed by 4.5 g. (0.11 mole) of acetonitrile. The mixture was cooled to 10° C., and 1-octene (11.2 g., 0.10 mole) was added dropwise over a period of 5 minutes. After stirring at room temperature for 8 hours and then standing overnight, the mixture, which was not homogeneous, was poured into a slurry of ice and water and neutralized with sodium carbonate and ammonium hydroxide. The mixture was extracted with three 100 ml. portions of ethyl ether, and the extract was dried over a mixture of magnesium sulfate and potassium carbonate. Evaporation of the ether gave 5.57 g. of a non-viscous, nearly colorless residue. Gas chromatographic analysis indicated the composition of the residue to be 1.6 weight percent ethyl ether, 41.3 weight percent 1-octene, 52.8 weight percent octyl acetate, and 4.3 weight percent acetamidooctanes. This represents a yield of acetamidooctanes of only 1.4 mole percent, thus demonstrating the method to be decidedly inferior to the method used in Example I.

EXAMPLE III

2-Acetamido-2,3-dimethylbutane.—Glacial acetic acid (50 ml.) was placed in a 500 ml. polyethylene reactor containing a Teflon-coated stirring bar, and 13 ml. (0.64 mole) of anhydrous hydrogen fluoride was added. The mixture was cooled in a slurry of ice and water, and 4.5 g. (0.11 mole) of acetonitrile was added dropwise, followed by dropwise addition of 8.4 g. (0.10 mole) of 2,3-dimethyl-2-butene. The mixture was allowed to gradually warm to room temperature (25° C.) and stirred for 20 hours. The light amber solution was then poured into 200 ml. of a slurry of ice and water and neutralized with solid sodium carbonate. The aqueous solution was then extracted with three 100 ml. portions of ethyl ether, and the extracts were dried over a mixture of magnesium sulfate and potassium carbonate. The evaporation of ether gave as a residue 8.28 g. (58 mole percent crude yield of 2-acetamido-2,3-dimethylbutane) of a pale yellow viscous oil which solidified to long white needles. When pressed dry on a clay plate, the needles melted at 67–69° C. Recrystallization from hexane gave 4.61 g. of needles, m.p. 68–69° C., identified as 2-acetamido-2,3-dimethylbutane ($C_8H_{17}NO$) by elemental analysis and molecular weight determination.

Anal.—Calcd. for $C_8H_{17}NO$: C, 67.08; H, 11.97; N, 9.78; mol. wt., 143.2. Found: C, 67.26; H, 11.78; N, 9.80; mol. wt., 157.

EXAMPLE IV

Acetamidocyclohexane.—A 300 ml. Monel reaction vessel was cooled in an ice-water bath under a nitrogen flow, and anhydrous hydrogen fluoride (50 ml., 2.5 moles) was added, followed by dropwise addition of acetonitrile (10.0 g., 0.24 mole). Cyclohexene (16.4 g., 0.20 mole) was added over a period of 5 minutes, and the contents of the closed reactor were agitated at 25° C. for 1 hour. The reaction was then poured into a mixture of ice and water. The resulting mixture was neutralized with sodium carbonate and extracted with three 100 ml. portions of ether. The combined ether extracts were dried over magnesium sulfate, and the solvent was removed, giving as a residue 19.9 g. (70.5 mole percent yield) of white crystals of acetamidocyclohexane, m.p. 104–105° C. This melting point was in excellent agreement with the literature value of 104° C.

EXAMPLE V

Formamidocyclohexane.—A 300 ml. Monel reaction vessel was cooled in an ice-water bath under a nitrogen flow, and anhydrous hydrogen fluoride (50 ml., 2.5 moles) was added, followed by dropwise addition of 10 ml. (0.26 mole) of liquid hydrogen cyanide. Cyclohexene (16.4 g., 0.20 mole) was then added slowly, and the contents of the closed reactor were shaken at 20° C. for 1 hour. The reaction mixture was poured into a mixture of ice and water, and the resulting mixture was made basic with sodium carbonate and extracted with ether. The ether solution was dried, and the solvent was removed to give 22.8 g. (90 mole percent crude yield of formamidocyclohexane) of a dark viscous residue. Distillation of a portion of this residue gave as the major distillates 1.07 g. of a fraction boiling at 88–90° C./0.4 mm., $n_D^{20}$ 1.4860, and 9.36 g. of a fraction boiling at 90–95° C./0.6 mm., $n_D^{20}$ 1.4860. Additionally, some higher boiling material resulted through thermal decomposition during the distillation. The two distillates described were identified as formamidocyclohexane ($C_7H_{13}NO$) by elemental analysis and molecular weight determination of the second fraction.

Anal.—Calcd. for $C_7H_{13}NO$: C, 66.10; H, 10.30; N, 11.02; mol wt., 127.2. Found: C, 66.20; H, 10.29; N, 10.99; mol wt. 123.

EXAMPLE VI

Formamidohexadecanes.—The procedure employed was identical to that described in Example V except that 22.4 g. (0.10 mole) of 1-hexadecene was used instead of cyclohexene, and 75 ml. (3.7 moles) of anhydrous hydrogen fluoride was employed. The dark residue remaining after removal of the ether weighed 22.4 g., representing a crude yield of formamidohexadecanes of 83.4 mole percent. Distillation of a portion of this residue gave as a major fraction a mixture of formamidohexadecanes ($C_{17}H_{35}NO$) as a pale yellow liquid boiling at 170–174° C./0.5 mm., $n_D^{20}$ 1.4572.

*Anal.*—Calcd. for $C_{17}H_{35}NO$: C, 75.8; H, 13.1; N, 5.2; mol. wt., 269.5. Found: C, 76.0; H, 13.0; N, 5.2; mol. wt., 300.

The infrared spectrum of this product exhibited strong bands at 3.1 microns and 6.05 microns, indicative of the $>$N—H and $>$C=O stretching frequencies, respectively, of the amide linkage.

EXAMPLE VII

Formamidooctanes.—An experiment was carried out as described in Example V except that 11.2 g. (0.10 mole) of 1-octane, 6 ml. (0.15 mole) of hydrogen cyanide, and 30 ml. (1.5 moles) of anhydrous hydrogen fluoride were used. After removal of the ether, there remained 16.3 g. of a red-brown residue representing a 103 mole percent crude yield of isomeric formamidooctanes. A portion of the residue was distilled, giving as the major fraction the isomeric formamidooctanes ($C_9H_{19}NO$) as an amber liquid boiling at 102–105° C./0.6 mm., $n_D^{20}$ 1.4471.

*Anal.*—Calcd. for $C_9H_{19}NO$: C, 68.74; H, 12.18; N, 8.91; mol. wt., 157.3. Found: C, 68.46; H, 12.46; N, 9.02; mol. wt., 165.

EXAMPLE VIII

Acetamidooctanes, with Recovery of Hydrogen Fluoride Prior to Hydrolysis.—An experiment was carried out to ascertain the effect of recovering essentially all of the hydrogen fluoride prior to hydrolysis. Two Monel reactors, Reactor A and Reactor B, each of 300 ml. capacity, were joined together by means of Monel tubing and two valves. In Reactor A, which was cooled in an ice bath, was placed 102.6 g. (5.1 moles) of anhydrous hydrogen fluoride, followed by 10.0 g. (0.24 mole) of acetonitrile and then 22.4 g. (0.20 mole) of 1-octene. The reactor was then shaken at 25° C. for 1 hour. Reactor B was evacuated to 0.5 mm., cooled to −78° C., and then connected by the Monel tubing to Reactor A. The valves were opened, and the transfer of hydrogen fluoride was allowed to occur by heating Reactor A in a water bath at 40–50° C. After about 4 hours the valves were closed, at which time 95 g. of hydrogen fluoride had been transferred to Reactor B, leaving 7.6 g. (0.38 mole) of hydrogen fluoride in Reactor A. Since 0.20 mole (4.0 g.) was required to form the iminofluoride, 3.6 g. was present as a hydrogen fluoride complex. The olive drab contents of Reactor A were poured into an ice-water slurry, and the resulting mixture was neutralized with sodium carbonate and extracted with ether. The ether extract was dried over magnesium sulfate, and the solvent was removed, giving 25.9 g. of a light yellow residue which represented 75.6 mole percent crude yield of isomeric acetamidooctanes. A portion of this mixture was distilled, giving as the major fraction a mixture of isomeric acetamidooctanes ($C_{10}H_{21}NO$) as a pale yellow liquid boiling at 94–97° C./0.25 mm., $n_D^{20}$ 1.4458.

*Anal.*—Calcd. for $C_{10}H_{21}NO$: C, 70.12; H, 12.36; N, 8.18; mol. wt., 171.3. Found: C, 70.84; H, 12.68; N, 7.83; mol. wt., 178.

EXAMPLE IX

Acetamidooctanes by Reverse Addition.—To a mixture of 11.2 g. (0.10 mole) of 1-octene and 5.0 g. (0.12 mole) of acetonitrile in a 300 ml. Monel reactor cooled in ice-water was added dropwise, with stirring, 25 ml. (1.2 moles) of anhydrous hydrogen fluoride. The closed reaction vessel was stirred at room temperature for 1 hour, and the reaction mixture was treated as described in Example IV. Removal of the ether gave as a residue 13.7 g. of crude isomeric acetamidooctanes, representing an 80 mole percent crude yield. Gas chromatographic analysis of this residue showed the ratio of the isomeric 2-, 3-, and 4-acetamidooctanes to be 43.3: 32.3: 24.4, respectively.

EXAMPLE X

Acetamidooctanes—Effect of Hydrogen Fluoride: 1-Octene Ratio.—Ten experiments were carried out in a 300 ml. Monel reaction vessel to ascertain the effect of altering the ratio of hydrogen fluoride to 1-octene in the preparation of a mixture of 2-, 3-, and 4-acetamidooctanes. In each experiment 11.2 g. (0.10 mole) of 1-octene was added to a mixture of 4.5 g. (0.11 mole) of acetonitrile and a given amount of anhydrous hydrogen fluoride. In each instance the mixture was stirred in the closed vessel for 30 minutes at room temperature. The reaction mixture was then poured into about 300 ml. of a mixture of ice and water, and the resulting mixture was neutralized with solid sodium carbonate. The mixture was extracted with three 100 ml. portions of ether, and the combined ether extracts were dried over magnesium sulfate. After removal of solvent from the dried extracts, the residue was analyzed gas chromatographically to determine the total amount of isomeric acetamidooctanes produced as well as the isomeric distribution of these substances among the 2-, 3-, and 4-acetamidooctanes. The results of these experiments are summarized in Table I.

TABLE I
Effect of HF:1-octene ratio on acetamidooctane formation

| HF employed | | Mole ratio, HF:1-octene | Weight of acetamido-octanes, grams | Distribution of isomeric acetamidooctanes, percen | | |
|---|---|---|---|---|---|---|
| Ml. | Moles | | | 2- | 3- | 4- |
| 80 | 4.0 | 40 | 10.7 | 20.8 | 42.2 | 37.1 |
| 60 | 3.0 | 30 | 14.2 | 20.5 | 35.9 | 43.5 |
| 40 | 2.0 | 20 | 14.3 | 20.5 | 40.0 | 38.9 |
| 20 | 1.0 | 10 | 13.9 | 22.2 | 42.5 | 35.5 |
| 15 | 0.75 | 7.5 | 9.6 | 28.7 | 38.1 | 33.2 |
| 10 | 0.5 | 5 | 5.6 | 30.8 | 39.5 | 29.8 |
| 5 | 0.25 | 2.5 | 1.2 | 63.5 | 29.3 | 6.9 |
| 2.0 | 0.10 | 1 | 0 | | | |
| 1.0 | 0.05 | 0.5 | 0 | | | |
| 0.5 | 0.025 | 0.25 | 0 | | | |

Table I shows that the acetamidooctanes were produced in substantial yields when the mole ratio of hydrogen fluoride to 1-octene was at least 5:1, the best yields being obtained when the ratio of hydrogen fluoride to 1-octene was within the range of 10:1 to 30:1. No acetamidooctanes were observed at hydrogen fluoride:1-octene ratios of 1:1 or lower. The relative amount of 2-acetamidooctane produced, with respect to the 3- and 4-isomers, generally increased as the mole ratio of hydrogen fluoride to 1-octene was decreased.

EXAMPLE XI

Acetamidooctanes—Effect of Acetonitrile:1-Octene Ratio.—Five experiments were carried out by the method described in Example X except that the amount of hydrogen fluoride used was held constant at 25 ml. (1.2 moles), and the amounts of acetonitrile and 1-octene were varied. The results of these experiments are summarized in Table II.

TABLE II
Effect of acetonitrile:1-octene ratio on acetamidooctane formation

| Acetonitrile employed | | 1-octene employed | | Mole ratio, acetonitrile:1-octene | Weight of acetamido-octanes, grams | Distribution of isomeric acetamidooctanes, percent | | |
|---|---|---|---|---|---|---|---|---|
| Grams | Mole | Grams | Mole | | | 2- | 3- | 4- |
| 4.1 | 0.10 | 22.4 | 0.20 | 0.5 | 16.1 | 23.3 | 41.0 | 35.7 |
| 4.5* | 0.11 | 11.2 | 0.10 | 1.1 | 13.9 | 22.2 | 42.5 | 35.5 |
| 8.2 | 0.20 | 11.2 | 0.10 | 2.0 | 14.7 | 28.5 | 41.3 | 30.2 |
| 20.5 | 0.50 | 11.2 | 0.10 | 5.0 | 9.2 | 62.8 | 30.1 | 7.1 |
| 41.0 | 1.0 | 11.2 | 0.10 | 10.0 | 1.4 | 86.5 | 11.8 | 1.7 |

*In this experiment, 20 ml. (1.0 mole) of hydrogen fluoride was used.

Table II shows that the amount of acetamidooctanes produced generally decreased as the ratio of acetonitrile to 1-octene was increased, the amount of acetamidooctanes theoretically possible in each experiment being 0.10 mole (17.1 g.). The relative amount of 2-acetamidooctane produced, with respect to the 3- and 4-isomers, generally increased as the mole ratio of acetonitrile to 1-octene was increased.

EXAMPLE XII

2-Acetamidopropane.—Anhydrous hydrogen fluoride (75 ml., 3.7 moles) was placed in a 300 ml. Monel reactor which had been purged with nitrogen and cooled in an ice-water bath. Acetonitrile (22.5 g., 0.55 mole) was then added dropwise, after which propylene was added rapidly to the reactor until the pressure within the reactor rose to 100 p.s.i.g. The reactor was then shaken vigorously at 15–20° C., whereupon the pressure dropped to 10 p.s.i.g. Propylene was again added until the pressure within the reactor rose to 100 p.s.i.g., and shaking of the reactor and repressurizing with propylene were repeated until a total of 22.0 g. (0.52 mole) of propylene had been added. Approximately 20 minutes were required for addition of the propylene. The reactor contents were then agitated for 85 minutes at room temperature, and the reaction mixture was poured into 500 ml. of ice-water. The resulting mixture was neutralized with approximately 300 ml. of concentrated ammonium hydroxide, and the mixture was then extracted with five 125 ml. portions of methylene chloride. The combined extracts were dried over a mixture of magnesium sulfate and potassium carbonate. Removal of solvent from the dried extracts gave as a residue 22.9 g. of a nearly colorless liquid. Distillation of this residue gave 12.1 g. (23 mole percent yield based on propylene charged) of 2-acetamidopropane ($C_5H_{11}NO$) distilling at 94° C./13 mm., $n_D^{25}$ 1.4297. [Lit. b.p. 201–203° C., $n_D^{25}$ 1.4273, Journal of Organic Chemistry, 24, 1027 (1959)]. Gas chromatographic analysis of the distillate gave only one peak. The infrared spectrum of the distillate exhibited strong bands at 3.08 microns ($>$N—H) and at 6.08 microns ($>$C=O).

Anal.—Calcd. for $C_5H_{11}NO$: C, 59.35; H, 10.98; N, 13.84; mol. wt., 101. Found: C, 58.55; H, 11.10; N, 13.78; mol. wt., 111.

EXAMPLE XIII

Acetamidoethane.—An experiment was carried out as in Example XII except that ethylene (16.0 g., 0.57 mole) was used instead of propylene, and the reactor was pressured with the olefin to 400 p.s.i.g. instead of 100 p.s.i.g. Removal of methylene chloride from the extracts of the neutralized reaction mixture gave as a residue 2.91 g. of a pale yellow liquid, the infrared spectrum of which exhibited a strong $>$N—H band at 3.08 microns and a strong $>$C=O band at 6.08 microns. Gas chromatographic analysis of the pale yellow liquid indicated the presence of 1.48 g. of acetamidoethane.

EXAMPLE XIV

Formamidooctadecanes.—The reaction of 25.2 g. (0.10 mole) of 1-octadecene with 10 ml. (0.26 mole) of hydrogen cyanide and 75 ml. (3.7 moles) of anhydrous hydrogen fluoride was carried out by the procedure of Example V, with similar treatment of the reaction mixture. Removal of solvent from the extracted products gave as a residue 26.1 g. of amber-colored crude formamidooctadecanes. Distillation of a portion of this residue gave a mixture of formamidooctadecanes ($C_{19}H_{39}NO$) distilling at 188–195° C./0.04 mm., which solidified to a soft white mass.

Anal.—Calcd. for $C_{19}H_{39}NO$: C, 76.67; H, 13.24; N, 4.71; mol. wt., 297.6. Found: C, 77.00; H, 13.50; N, 4.86; mol. wt., 316.

EXAMPLE XV

Butyramidoocetanes.—To 12.0 g. (0.17 mole) of butyronitrilein 60 ml. (3.0 moles) of anhydrous hydrogen fluoride was added 17.8 g. (0.16 mole) of 1-octene, and the mixture was stirred at room temperature for 1 hour. The reaction mixture was poured into ice-water, and the resulting mixture was neutralized with ammonium hydroxide, followed by extraction with ether. From the ether extract was obtained 28.5 g. (88 mole percent yield) of a crude mixture of butyramidooctanes ($C_{12}H_{25}NO$), a portion of which was distilled to give a purified mixture of butyramidooctanes distilling at 111–119° C./0.4 mm., $n_D^{20}$ 1.4473. The purified mixture was subjected to elemental analysis.

Anal.—Calcd. for $C_{12}H_{25}NO$: C, 72.30; H, 12.64; N, 7.03. Found: C, 72.37; H, 12.78; N, 6.90.

EXAMPLE XVI

Acetamidooctanes.—To a 500 ml. polyethylene reaction vessel equipped with stirrer and cooled in a dry ice-acetone both were added 100 ml. of liquid sulfur dioxide and 25 ml. (1.2 moles) of anhydrous hydrogen fluoride. Acetonitrile (4.5 g., 0.11 mole) was added, followed by the addition of 11.2 g. (0.10 mole) of 1-octene to the mixture maintained at about —40° C. The temperature was then allowed to rise to 20° C., with stirring, over a period of 8 hours. After standing overnight, the mixture was poured into ice water and neutralized with sodium carbonate. The resulting mixture was extracted with three 150 ml. portions of ether, and the combined ether extracts were dried over a mixture of magnesium sulfate and potassium carbonate. Evaporation of ether gave as a residue 15.5 g. of a pale yellow liquid, representing a 91 mole percent crude yield of a mixture of 2-, 3-, and 4-acetamidooctanes, A portion of this liquid was distilled to give a mixture of the purified 2-, 3-, and 4-acetamidooctanes ($C_{10}H_{21}NO$) as a colorless product boiling at 104–109° C./0.2 mm., $n_D^{20}$ 1.4454. The purified product was subjected to elemental analysis and osmometric weight determination.

Anal.—Calcd, for $C_{10}H_{21}NO$: C, 70.12; H, 12.38; N, 8.18; mol. wt., 171. Found: C, 70.00; H, 12.43; N, 8.22; mol. wt., 171.

EXAMPLE XVII

Acetamidooctanes.—To a mixture of 50 ml. of sulfur dioxide and 10 ml. (0.5 mole) of anhydrous hydrogen fluoride in a Monel reactor equipped with stirrer and cooled in a Dry Ice-acetone bath was added 4.5 g. (0.11 mole) of acetonitrile. 1-Octane (11.2 g., 0.10 mole) was then added dropwise, and the contents of the closed reactor were warmed to room temperature, with stirring, after which the mixture was stirred at room temperature for 30 minutes. The reaction mixture was poured into ice-water and neutralized with sodium carbonate. The resulting mixture was extracted with three 100 ml. portions of ether, and the combined ether extracts were dried over magnesium sulfate. Evaporation of ether gave 11.6 g. of liquid residue which was shown by gas chromatography to contain 42 weight percent isomeric acetamidooctanes, the remainder being substantially 1-octene. The isomeric acetamidooctanes comprised 72 weight percent 2-acetamidooctane, 20 weight percent 3-acetamidooctane, and 8 weight percent 4-acetamidooctane, each determined gas chromatographically by comparison with authentic specimens. The preponderance of 2-acetamidooctane, relative to its isomers, showed that isomerization took place to only a minor extent during the course of the reaction.

EXAMPLE XVIII

Acetamidooctanes, Prepared in the Absence of Sulfur

Dioxide.—A comparative experiment was carried out by the method of Example XVII except that no sulfur dioxide was employed. To a mixture of 10 ml. (0.5 mole) of anhydrous hydrogen fluoride and 4.5 g. (0.11 mole) of acetonitrile in a Monel reactor equipped with stirrer and cooled in ice-water was added dropwise 11.2 g. (0.10 mole) of 1-octene. The contents of the closed reactor were warmed to room temperature, with stirring, after which the mixture was stirred at room temperature for 30 minutes. After hydrolysis, neutralization, extraction, and drying as in Example XVII, removal of ether gave 11.9 g. of liquid residue which was shown by gas chromatography to contain 47 weight percent isomeric acetamidooctanes, 11 weight percent fluorooctane, 33 weight percent 1-octene, and 9 weight percent ether. The isomeric acetamidooctanes comprised 30 weight percent 2-acetamidooctane, 40 weight percent 3-acetamidooctane, and 30 weight percent 4-acetamidooctane, each determined gas chromatographically by comparison with authentic specimens. As 70 weight percent of the isomeric acetamidooctanes were the 3- and 4-acetamidooctanes, isomerization took place to a major extent during the course of the reaction.

EXAMPLE XIX

Actamidooctanes.—In an experiment carried out by the method of Example XVI, except that 2-octane instead of 1-octene was used, 14.4 g. of a crude mixture of 2-, 3-, and 4-acetamidooctanes was produced, representing an 84.5 mole percent crude yield of the isomeric acetamidooctanes, identified gas chromatographically by comparison with authentic specimens.

EXAMPLE XX

2-Acetamido-2,3-dimethylbutane.—To a 500 ml. polyethylene reaction vessel equipped with stirrer and cooled in a Dry-Ice-acetone bath were added 50 ml. of liquid sulfur dioxide and 13 ml. (0.64 mole) of anhydrous hydrogen fluoride. Acetonitrile (4.5 g., 0.11 mole) was added, followed by the dropwise addition of 8.4 g. (0.10 mole) of 2,3-dimethyl-2-butene over a period of 15 minutes to the mixture maintained at about −20° C. The temperature was then allowed to rise to 20° C., with sulfur dioxide evolution, over a period of 3½ hours. The reaction mixture was poured into about 150 ml. of ice-water and neutralized with solid sodium carbonate. The resulting mixture was extracted with three 150 ml. portions of ether, and the combined ether extracts were dried over a mixture of magnesium sulfate and potassium carbonate. Evaporation of ether gave as a residue 5.9 g. of a white solid melting at 66.5–68.5° C., representing a 41.3 mole percent yield of 2-acetamido-2,3-dimethylbutane. Gas chromatographic analysis of the product indicated it to be nearly pure. Recrystallization from hexane gave the pure product melting at 68–69° C., identified gas chromatographically by comparison with an authentic specimen.

EXAMPLE XXI

Acetamidododecanes.—To a 500 ml. polyethylene reaction vessel equipped with stirrer and cooled in a Dry-Ice-acetone bath were added 75 ml. of liquid sulfur dioxide and 25 ml. (1.2 moles) of anhydrous hydrogen fluoride. Acetonitrile (4.5 g., 0.11 mole) was added, followed by dropwise addition of 16.8 g. (0.10 mole) of 1-dodecene over a period of 5 minutes. The mixture was stirred at about −30° C. for 2 hours, after which it was allowed to warm to room temperature, with subsequent standing overnight. The reaction mixture was poured on ice and neutralized with sodium carbonate. The resulting mixture was then extracted twice with chloroform and once with ether, and the combined organic layers were dried over magnesium sulfate. Removal of solvents gave 23.4 g. of a residue, representing, after allowance for the residual chloroform present, a 91 mole percent crude yield of a mixture of isomeric acetamidododecanes. Ten grams of this residue was distilled to give 6.6 g. of a purified mixture of the isomeric acetamidododecanes ($C_{14}H_{29}NO$) boiling at 130–135° C./0.3 mm., $n_D^{20}$ 1.4515. The purified mixture was subjected to elemental analysis and molecular weight determination.

*Anal.*—Calcd. for $C_{14}H_{29}NO$: C, 73.95; H, 12.86; N, 6.16; mol. wt., 227. Found: C, 74.74; H, 12.78; N, 6.00; mol. wt., 230.

EXAMPLE XXII

Acetamidocyclohexane.—An experiment was carried out by the procedure of Example XVI, except that cyclohexene (16.4 g., 0.20 mole) was used instead of 1-octene, and 9.0 g. (0.22 mole) of acetonitrile and 75 ml. of liquid sulfur dioxide were used. The amount of anhydrous hydrogen fluoride employed was the same as in Example XVI. Removal of ether used in the extraction process gave as a residue 16.5 g. of a white solid melting at 94–98° C., representing a 59 mole percent crude yield of acetamidocyclohexane. Recrystallization of a portion of this solid from hexane gave pure acetamidocyclohexane ($C_8H_{15}NO$) melting at 106–107° C., in substantial agreement with the literature value of 104° C. The purified product was subjected to elemental analysis.

*Anal.*—Calcd. for $C_8H_{15}NO$: C, 68.04; H, 10.71 N, 9.92. Found: C, 67.31; H, 10.83; N, 9.80.

EXAMPLE XXIII

Acetamidocyclopentane.—An experiment was carried out by the procedure of Example XXII, except that cyclopentene (13.6 g., 0.20 mole) was used instead of cyclohexene. Removal of ether from the extracted product gave 15.1 g. of liquid residue, representing a 60 mole percent crude yield of acetamidocyclopentane. Gas chromatographic analysis indicated this residue to be nearly pure product. A portion of the residue was distilled at 89–92° C./0.5 mm. to give a product which on redistillation melted at 49–52° C. This purified product, acetamidocyclopentane ($C_7H_{13}NO$), was subjected to elemental analysis and osmometric molecular weight determination.

*Anal.*—Calcd. for $C_7H_{13}NO$: C, 66.2; H, 10.2; N, 11.0; mol. wt., 127. Found: C, 66.2; H, 10.2; N, 10.4; mol. wt., 146.

EXAMPLE XXIV

Benzamidooctanes.—To 50 ml. of liquid sulfur dioxide and 25 ml. (1.2 moles) of anhydrous hydrogen fluoride in a polyethylene reaction vessel equipped with stirrer and cooled in a Dry Ice-acetone bath was added 10.3 g. (0.10 mole) of benzonitrile. To the resulting mixture was added dropwise 11.2 g. (0.10 mole) of 1-octene over a period of 5 minutes. The cooling bath was allowed to warm to room temperature, and stirring was continued for 4 hours. The reaction mixture was poured into ice-water and neutralized with solid sodium carbonate. The resulting mixture was extracted with ether, and the ether extracts were dried over a mixture of magnesium sulfate and potassium carbonate. Evaporation of ether gave 23.1 g. of residual product, representing a 94 mole percent crude yield of isomeric benzamidooctanes. Distillation of this residual product gave a purified mixture of isomeric benzamidooctanes ($C_{15}H_{23}NO$) boiling at 147–148° C./0.5 mm., $n_D^{20}$ 1.5143. This purified mixture was subjected to elemental analysis and osmometric molecular weight determination.

*Anal.*—Calcd. for $C_{15}H_{23}NO$: C, 77.3; H, 9.9; N, 6.0; mol. wt., 233. Found: C, 77.4; H, 10.1; N, 5.9; mol. wt., 245.

EXAMPLE XXV

Formamidocyclododecane.—To 50 ml. (2.5 moles) of anhydrous hydrogen fluoride and 10 ml. (0.26 mole) of liquid hydrogen cyanide in a polyethylene reaction vessel equipped with stirrer was added 16.6 g. (0.10 mole) of cyclododecene over a period of 6 minutes. The resulting mixture was then stirred at room temperature for 1 hour. The reaction mixture was poured into ice-water, and the resuluting mixture was neutralized with ammonium hydroxide. The mixture was then extracted with ether, the ether extract was dried over magnesium sulfate, and the solvent was removed, giving as a residue 19.4 g. of a brown gummy solid representing a 92 mole percent crude yield of formamidocyclododecane. Recrystallization of this material from hexane-ethanol mixture gave 8.0 g. of buff-colored, fluffy crystals of formamidocyclododecane ($C_{13}H_{25}NO$), m.p. 112–113° C., identified by elemental analysis and molecular weight determination.

*Anal.*—Calcd. for $C_{13}H_{25}NO$: C, 73.88; H, 11.92; N, 6.63; mol. wt., 211.4. Found: C, 74.00; H, 11.97; N, 6.65; mol. wt., 208.

EXAMPLE XXVI

Acetamidocyclododecane.—In a procedure similar to that described in Example XXV, except that acetonitrile (8.0 g., 0.20 mole) was used instead of hydrogen cyanide, there was obtained 20 g. of crude product melting at 138–140° C., representing an 89 mole percent crude yield of acetamidocyclododecane. Recrystallization of this product from a hexane-ethanol mixture gave 15.3 g. of acetamidocyclododecane ($C_{14}H_{27}NO$) as long white needles, m.p. 141–142° C., identified by elemental analysis and molecular weight determination.

*Anal.*—Calcd. for $C_{14}H_{27}NO$: C, 74.66; H, 12.00; N, 6.22; mol. wt., 225.3. Found: C, 74.29; H, 12.24; N, 6.16; mol. wt., 222.

EXAMPLE XXVII

2-Acetamido-2-methylpropane.—To a mixture of 60 ml. (3.0 moles) of anhydrous hydrogen fluoride and 12.3 g. (0.30 mole) of acetonitrile in a 300 ml. Monel reaction vessel cooled in a Dry Ice-acetone bath was added dropwise 11.0 g. (0.19 mole) of isobutylene which had been previously cooled in a Dry Ice-acetone bath. The reaction vessel was then closed and shaken at 30° C. for 2 hours. The reaction mixture was poured into water, and the resulting mixture was neutralized with ammonium hydroxide. The mixture was then extracted with ether, the ether extract was dried over magnesium sulfate, and the solvent was removed, giving as a residue 4.6 g. of solid representing a 21 mole percent crude yield of 2-acetamido-2-methylpropane, identified gas chromatographically by comparison with an authentic specimen.

EXAMPLE XXVIII 2,5-diacetamido-2,5-dimethylhexane.—To a 500 ml. polyethylene reaction vessel equipped with stirrer and cooled in a Dry Ice-acetone bath were added 75 ml. of anhydrous hydrogen fluoride and 25 g. (0.60 mole) of acetonitrile. The contents were cooled to −50° C. and 22.0 g. (0.20 mole) of 2,5-dimethyl-1,5-hexadiene were added over a period of 5 minutes with the temperature being maintained at −45 to −50° C. The cooling bath was removed and the mixture was allowed to warm to 0° C. over a period of 30 minutes. When the temperature reached 0° C., the pale yellow liquid was poured on ice water and neutralized with ammonium hydroxide. The white solids which formed were filtered and when dry were recrystallized from 200 ml. of absolute ethanol to give 9.85 g., m.p. 226°–228° C. of pure 2,5-diacetamido-2,5-dimethylhexane. The mother liquors could be evaporated to give additional product.

*Anal.*—Calcd. for $C_{12}H_{24}N_2O_2$: C, 63.21; H, 10.61; N, 12.29. Found: C, 63.28; H, 10.55; N, 11.85.

The infrared spectrum exhibited a strong N—H band at 3.14 microns and the characteristic carbonyl absorbance at 6.15 microns. Additional evidence for the structure is provided by the nuclear magnetic resonance spectrum run in trifluoroacetic acid which is as follows:

$$CH_3\text{-}\underset{\underset{a}{NHCOCH_3}}{\overset{\overset{d}{CH_3}}{C}}\text{-}\underset{c}{CH_2}\text{-}\underset{c}{CH_2}\text{-}\underset{\underset{a}{NHCOCH_3}}{\overset{\overset{d}{CH_3}}{C}}\text{-}CH_3 d$$

| Peak, tau units | Multiplicity | Proton Ratio | Assignment |
|---|---|---|---|
| 1.72 | Singlet | 2 | a |
| 7.53 | do | 6 | b |
| 8.06 | do | 4 | c |
| 8.50 | do | 12 | d |

EXAMPLE XXIX

Formamidocyclohexane.—A one-liter, Monel reactor was charged with 290 grams (14.5 moles) of hydrogen fluoride, 50 grams (2.8 moles) of water, 66 grams (2.4 moles) of hydrogen cyanide in that order and the temperature was maintained at 16° C. Cyclohexene (164 grams, 2.0 moles) was added over a period of 45 minutes at 16° C. and the bomb was then heated to 54° C. for 5 hours. The mixture was discharged from the autoclave into a polyethylene bottle immersed in a Dry Ice-acetone bath. The reaction mixture was then poured cautiously into ice water and neutralized with ammonium hydroxide. After repeated extractions with a total of one liter of ether and drying over magnesium sulfate, the ether was removed on a rotary evaporator and there remained 242.6 grams of a light brown liquid. A portion, 239.8 grams, of this material was distilled at 95–97° C./0.4 mm. to give 170.0 grams of purified formamidocyclohexane representing a 67 percent yield of theoretical. Comparison of properties with a standard sample confirmed the structure.

EXAMPLE XXX

2-Acetamido-2-methylbutane.—A 300 ml. Monel reactor was cooled in ice water and charged with hydrogen fluoride followed by the specified amount of catalyst and then 10 grams (0.26 mole) of acetonitrile. 2-Methyl-2-butene (14.0 g., 0.20 mole) was added dropwise and the reactor was capped and shaken at between 25–40° C. for the specified period of time. The contents were then poured on ice, neutralized with ammonium hydroxide and extracted with ether. After drying the extracts over magnesium sulfate and removal of the solvent on a rotary evaporator, there remained the product. This was analyzed for 2-acetamido-2-methylbutane content by gas chromatography and compared with an authentic sample. Results of comparative runs with water, ammonium fluoride, and mixtures thereof are given below.

| HF, ml. | Catalyst, g. | Temp., ° C. | Time, hr. | Percent of theoretical yield of 2-acetamido-2-methylbutane |
|---|---|---|---|---|
| 50 | None | 40 | 2.0 | 23.6 |
| 32 | Water, 18.0 | 40 | 2.0 | 91.4 |
| 50 | NH₄F, 7.0 | 30 | 0.5 | 58.9 |
| 50 | {NH₄F, 8.5, Water, 5.0} | 30 | 0.5 | 82.9 |
| 50 | None | 30 | 1.5 | 8.9 |
| 50 | Water, 5.0 | 30 | 2.0 | 39.5 |

EXAMPLE XXXI

2-Acetamidobicyclooctane-3.3.0.—The reaction was run by a procedure identical to that described in Example XXVIII except that 21.6 g. (0.20 mole) of 1,5-cyclooctadiene was used in place of 2,5-dimethyl-1,5-hexadiene. On work-up and removal of the extraction solvent, there remained 28.1 g., of a yellow viscous residue. A portion of the material was sublimed at a pot temperature of 150–220° C. at 0.2 mm. with 5.2 g. of a mushy solid being collected. This was recrystallized twice from cyclohexane and washed with pentane to give white powdery crystals, m.p. 126–132° C.

Anal.—Calcd. for $C_{10}H_{17}NO$: C, 71.92; H, 10.26; N, 8.39; mol. wt. 167. Found: C, 71.76; H, 10.35; N, 8.40; mol. wt. 164.

The infrared spectrum exhibited a strong N—H band at 3.1 microns and the characteristic carbonyl band at 6.1 microns with no evidence for olefinic linkage. The nuclear magnetic resonance spectrum further supports the structure which indicated the N—H proton at 3.23 tau and a multiplet centered at 8.08 tau, the ring protons and a singlet at 8.08 tau indicative of the methyl protons. The relative areas were approximately 1:16, indicative of 2-acetamidobicyclooctane-3.3.0.

EXAMPLE XXXII

2-Acetamido-2,3-dimethylbutane.—To 70 ml. (3.5 moles) of anhydrous hydrogen fluoride in a 300 ml. Monel reactor cooled in an ice bath was added 34.4 g. (0.40 mole) of 2,3-dimethylbutane. A mixture of 10.0 g. (0.24 mole) of acetonitrile and 7.4 g. (0.10 mole) of tert-butyl alcohol was then added dropwise over a period of approximately 10 minutes. The mixture was shaken for 4 hours at 50° C., and then poured on ice, neutralized with ammonium hydroxide, and extracted with ether. The ether extract was dried over magnesium sulfate, and most of the solvent was removed under reduced pressure, giving as a residue 5.4 g. of a yellow oil. Gas chromatographic analysis of this oil on a 9-foot Apiezon L column indicated 68.3 weight percent of the oil to be the desired 2-acetamido-2,3-dimethylbutane, 8.3 weight percent of the oil being 2-acetamido-2-methylpropane produced as a by-product. Both products were identified gas chromatographically by comparison of their retention times with the retention times of authentic specimens.

EXAMPLE XXXIII

2-Acetamido-2,3-dimethylbutane.—To a mixture of 100 ml. of sulfur dioxide and 50 ml. (2.5 moles) of anhydrous hydrogen fluoride in a polyethylene reaction vessel immersed in a Dry Ice-acetone bath was added 34.4 g. (0.40 mole) of 2,3-dimethylbutane. To the stirred mixture at about —40° C. was added a mixture of 4.5 g. (0.11 mole) of acetonitrile and 7.4 g. (0.10 mole) of tert-butyl alcohol over a period of 5 minutes. The resulting mixture was kept cold for about 2 hours, after which it was allowed to warm to room temperature. After standing overnight, the mixture was poured on ice and neutralized with solid sodium carbonate. The basic solution was then extracted with ether, and the ether extract was dried over magnesium sulfate. Removal of most of the solvent gave as a residue 2.8 g. of a liquid which was shown by gas chromatographic analysis to be 28.6 weight percent 2-acetamido-2,3-dimethylbutane and 46.5 weight percent 2-acetamido-2-methylpropane.

EXAMPLE XXXIV 2,3,3,6,6,7 - Hexamethyl - 5 - aza-1,4-octadiene.—To a mixture of 25 ml. (1.2 moles) of anhydrous hydrogen fluoride and 50 ml. of liquid sulfur dioxide at —40° C. in a polyethylene reactor equipped with stirrer was added 6.0 g. (0.12 mole) of sodium cyanide. Then 8.4 g. (0.10 mole) of 2,3-dimethyl-2-butene was added dropwise over a period of 5 minutes. The mixture was allowed to warm to room temperature, with stirring, and stirring at room temperature was continued. After a total reaction time of 5 hours, the resulting yellow solution was poured on ice, and the mixture thus produced was neutralized with solid sodium carbonate. The neutralized solution was extracted with three 100 ml. portions of ether, and the combined ether extracts were dried over magnesium sulfate. Removal of solvent from the dried extracts gave as a residue 10.7 g. of a red-brown liquid. The product was vacuum distilled to give 2.0 g. of a colorless product, B.P. 33–35° C./0.5 mm., $n_D^{20}$ 1.4442, identified as 2,3,3,6,6,7-hexamethyl-5-aza-1,4-octadiene ($C_{13}H_{25}N$) by elemental analysis, molecular weight determination, infrared analysis, and nuclear magnetic resonance analysis.

Anal.—Calcd. for $C_{13}H_{25}N$: C, 79.9; H, 12.9; N, 7.2; mol. wt., 195. Found: C, 79.4; H, 12.6; N, 7.4; mol. wt. 208.

The infrared spectrum of the product had a sharp band at 6.0 microns indicative of the imine linkage. It had no band indicative of the amino group or of the carbonyl group. The nuclear magnetic resonance spectrum was consistent with that to be expected for 2,3,3,6,6,7-hexamethyl-5-aza-1,4-octadiene, the proton assignment being as shown below.

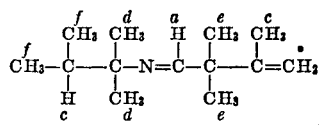

| Peak, tau units | Multiplicity | Proton Ratio | Assignment |
|---|---|---|---|
| 2.68 | Singlet | 1 | a |
| 5.22 | do | 2 | b |
| 8.35 | do* | 4 | c |
| 8.85 | do | 6 | d |
| 9.00 | do | 6 | e |
| 9.16 | Doublet | 6 | f |

*Superimposed over multiplet.

As indicated herein before, the usefulness of the compounds produced by the invention herein disclosed reaches into many branches of chemical industry. Some of the compounds herein described are useful substitutes for camphor in the plasticizing of nitrocellulose, cellulose acetate and vinyl resins and as intermediates in the preparation of therapeutic agents. High molecular weight amides of the invention are valuable ingredients in grease compounding, as anti-tack agents in plastic preparations, as detergents and wetting agents, etc.

It has been found that the amides of the invention have particular utility as pesticides in controlling insects, fungus, nematodes, and other pests. Some of the amides of the invention are quite effective as insecticides against the housefly, red spider mite, Mexican bean bettles, red-banded leaf rollers and the like. Many of the amide compounds of the invention are useful as fungicides against various species including Rhizoctonia solani, bean mildew and as an antiparasitic against the nematode Panagrellus. Also additional amide compounds of the invention are effective as herbicides, exhibiting post-emergence herbicidal activity against broadleaf plants.

The pesticides of the present invention can be advantageously used in any of the forms in which pesticides are commonly employed, such as solution, emulsions, aerosols, wettable powders and the like. Well known dispersing agents can be used when preparing emulsions with water or other immiscible liquids and the resulting compositions employed as sprays. One convenient method for the preparation of aqueous suspensions is to dissolve an amide of the invention in a solvent immiscible with water, such as xylene, add a surface active agent, and finally water. When applying the amides as insecticides in the form of aerosols, they can be dissolved in such solvents as acetone, cyclohexanone and the like. These solutions are then employed in an aerosol bomb in conjunction with a propellant such as a halogenated hydrocarbon and other similar non-hazardous compressible, normally gaseous materials.

When applying the pesticides, especially as an insecticide, of this invention in a solvent or adjuvant carrier medium, the lower effective limit of the insecticide ingredient concentration is about 0.1 weight percent. Generally, it is advantageous to make application of the insecticide in a manner so as to deposit from about 1–10 grams of the active ingredient on each 100 square feet of surface. However, larger or smaller amounts may be applied, as desired, although it is generally neither economical to employ larger amounts nor efficient, because of short insecticidal action, to employ smaller amounts. One excellent method for applying these insecticides is in the form of aqueous spray solution. A typical aqueous spray solution or formulation comprises about 0.15 weight percent of one of the insecticides of this invention, a small amount of an emulsifier such as an alkylated aryl polyether alcohol (Triton X–100) and the remainder water.

In using the active amide materials of the present invention, say, as insecticidal materials, they can be applied in undiluted form, as concentrate, or in high dilution. They may be applied in undiluted form or as concentrates with the assistance of fog or similar apparatus to trees and other plants, as well as other bases frequented by insects, fungus, and the like. Because of their effectiveness and to lessen cost and to facilitate distribution of the small amount of material necessary to obtain the desired pesticidal results, they are, as a practical matter, usually applied in admixture with a carrier (adjuvant), preferably water. When used with adjuvant carriers, either as concentrates or a high dilution, as indicated above, the active pesticidal ingredients of the present invention may be applied with or without a wetting agent. Further, liquid carriers may be water, mineral oils, organic solvents, or other solvents or suspending agents. For general use on plants, for example, to combat red spider mites, Mexican bean beetles, red-banded leaf rollers, etc., the pesticidal material is usually employed as a water emulsion. The concentrates or diluted compositions of the present invention may also contain other insecticidal, miticidal and fungicidal agents if desired. Further, insecticidal materials of the present invention can be advantageously employed as dormant oil sprays, and as base oils for both insecticides and fungicides.

When a plant is diseased, as when attacked by fungus, etc. the amide agent of the invention can be applied in solution or in dust form and usually are applied in a low concentration of the order of 0.01–5 percent. More or less agent in the composition applied is usually not advantageous. One skilled in the art can readily determine the concentration of the specific amide selected which he will use in a given case. This can be done, as he will know, by mere routine tests. The amide agent of the invention can be applied without dilution of any kind but this is not now preferred when treating plants. The concentrations given herein are by way of guidance only.

The amides of the present invention are also useful as herbicides whereby plant foliage is killed by applying a solution of at least one of the amides to the plants which are to be killed. Some examples of suitable solvents which can be employed are diesel fuel, kerosene, Stoddard solvent, benzene, toluene, ethyl alcohol, and the like. Hydrocarbon solvents are preferred, and the most preferred solvent is isoparaffinic hydrocarbon alkylate fraction having an approximate boiling range of 260 to 800° F., prepared by the alkylation of isoparaffins with olefins by bringing these reactants together in the presence of hydrofluoric acid. This type of isoparaffinic hydrocarbon is available commercially under the trade name of Soltrol.*

The concentrations of the solutions of the herbicides are not always critical, since very dilute and quite concentrated solutions can be employed. The amount of active herbicidal materal which is applied to plant foliage to kill the plant will vary depending upon the specific plant being treated, the solvent employed, and the particular amide compound used. The herbicides of this invention are quite effective at rates as low as 3.5 pounds per acre, although when employing the herbicides of this invention to kill plants which are very susceptible to herbicides, millet for example, even smaller amounts can be employed. From a practical standpoint, herbicides usually are employed in solutions in concentrations of from 0.01 to 5 percent by weight of the particular amide.

EXAMPLE XXXV

A number of amide compounds of the invention were tested for insecticidal, fungicidal, antiparasitic, and herbicidal activity. The specific amide compounds tested were acetamidocyclododecane, a mixture of isomeric benzamido-octanes, and acetamidododecanes (isomeric mixture).

Acetamidocyclododecane in an adjuvant carrier has been found to function effectively as an insecticide against the housefly and also as a soil fungicide against *Rhizoctonia solani*. The acetamidocyclododecane has also been found to exhibit activity as an antiparasitic against the nematode *Panagrellus*.

In another series of tests, the mixture of isomeric benzamidooctanes prepared according to the process of the invention was found to function as an insecticide against the housefly, as an insecticide against the red spider mite, and as an insecticide against the Mexican bean beetle. The mixture of isomeric benzamidooctanes were used in an adjuvant carrier. This mixture of isomeric benzamidooctanes has also been found to serve as a herbicide exhibiting post-emergence heribical activity against broadleaf plants.

In another series of tests, a mixture of isomeric acetamidododecanes prepared by the process of this invention in an adjuvant carrier was found to function effectively as an insecticide against the Mexican bean beetle and as an insecticide against the red-banded leaf roller. The mixture of isomeric acetamidodecanes was also found to be effective as a fungicide against bean mildew.

I claim:

1. A process for producing a secondary amide comprising contacting in the liquid phase a saturated hydrocarbon having a tertiary carbon atom wherein said saturated hydrocarbon is an acyclic or cyclic hydrocarbon having up to 30 carbon atoms, a cyanide of the formula R"CN wherein R" is selected from hydrogen or a hydrocarbon radical having up to 24 carbon atoms selected from the group consisting of alkyl, cycloalkyl, aryl, alkaryl, and aralkyl radicals, and a compound capable of forming carbonium ions selected from an olefin having 3–10 carbon atoms, a secondary or tertiary alcohol containing up to 5 carbon atoms, a secondary or tertiary alkyl chloride having up to 5 carbon atoms, and a secondary or tertiary alkylfluoride having up to 5 carbon atoms in the presence of hydrogen fluoride, and hydrolyzing the reaction mixture thus formed to form said secondary amide.

2. A process according to Claim 1 wherein said contacting is effected at a temperature in the range of —40° to 75° C., the mole ratio of saturated hydrocarbon to carbonium ion forming compound is 0.5:1 to 20:1, the mole ratio of cyanide to carbonium ion forming compound is 0.2:1 to 20:1, and the mole ratio of hydrogen fluoride to carbonium ion forming compound is 2:1 to 60:1.

3. A process according to Claim 1 wherein said saturated hydrocarbon is 2,3-dimethylbutane, said cyanide is acetonitrile, said hydrogen fluoride is anhydrous, and said carbonium ion forming compound is tert-butylalcohol.

4. A process according to Claim 1 wherein said contacting occurs in the presence of ammonium fluoride.

5. A process according to Claim 1 wherein said contacting is carried out in the presence of sulfur dioxide as a reaction diluent.

6. The process of Claim 1 wherein said saturated hydrocarbon is selected from 2-methylpropane, 2-methylbutane, 3-methylpentane, 2,3-dimethylbutane, 3-methylheptane, 4-ethyldecane, 2,4-dimethyldodecane, 3-ethyldodecane, 6-

*Phillips Petroleum Company trademark.

butylhexacosane, methylcyclopentane, methylcyclohexane, 1,3 - dimethylcyclohexane, ethylcyclooctane, butylcyclodecane, decahydronaphthalene, adamantane, and perhydroacenaphthene.

References Cited

UNITED STATES PATENTS

| | | | |
|---|---|---|---|
| 3,338,967 | 8/1967 | Potts et al. | 260—583 |
| 3,514,485 | 5/1970 | Norell | 260—561 |
| 3,527,828 | 9/1970 | Mango | 260—677 |

OTHER REFERENCES

Parker: Advances in Organic Chemistry: Methods and Results, vol. 5, pp. 1-1-15 and 22-37 (1965).

HARRY I. MOATZ, Primary Examiner

U.S. Cl. X.R.

260—562 R, 557 R, 557 B, 558 R; 424—324, 320; 260—29.1 R, 566 B; 71—118